Nov. 17, 1931.  G. W. ENGSTROM  1,832,008
TORQUE BEAM FOR RAILWAY TRUCKS
Filed Dec. 5, 1929
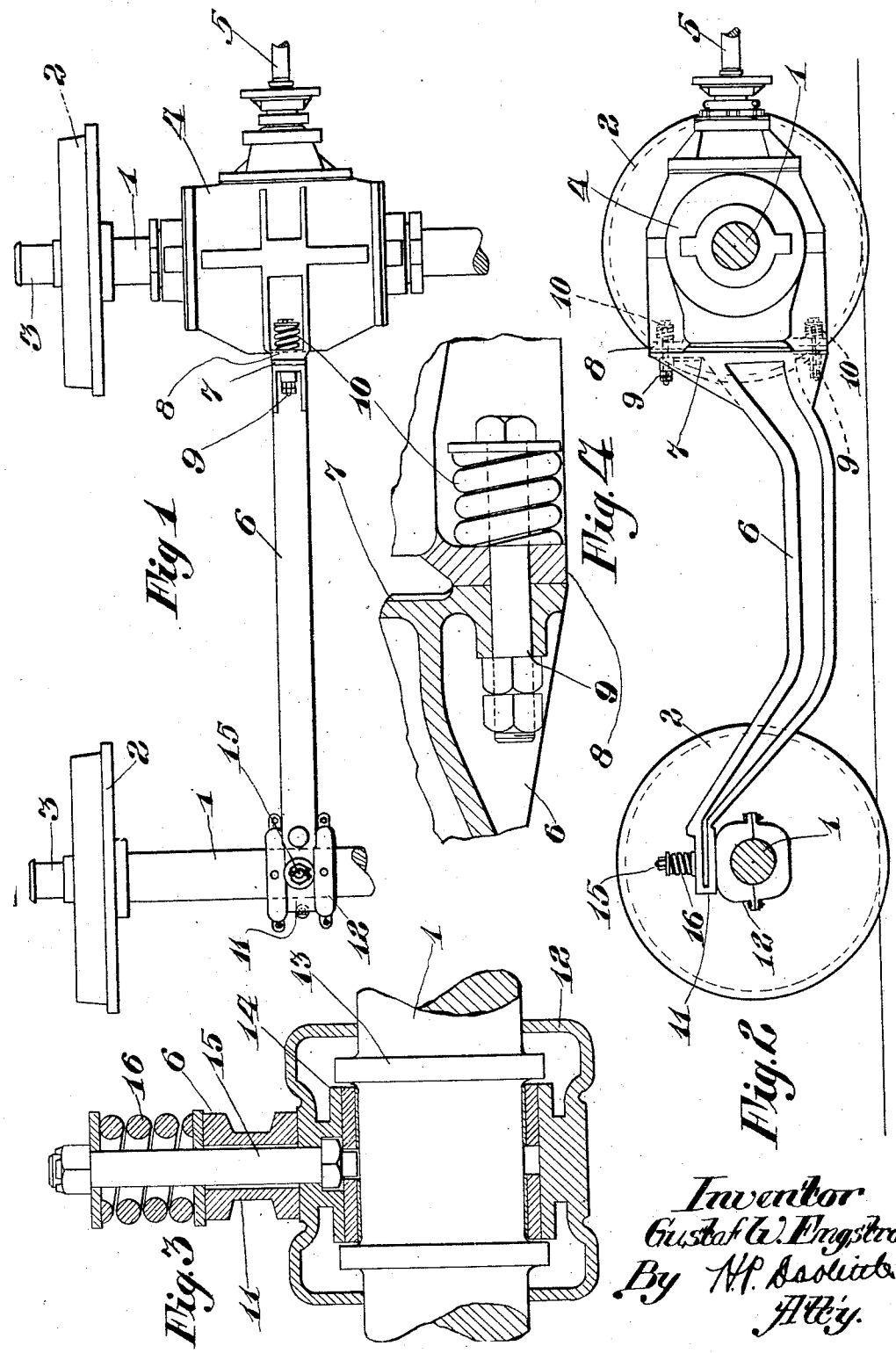
Inventor
Gustaf W. Engstrom
By [signature]
Atty.

Patented Nov. 17, 1931

1,832,008

UNITED STATES PATENT OFFICE

GUSTAF W. ENGSTROM, OF RIVERSIDE, ILLINOIS, ASSIGNOR TO INTERNATIONAL HARVESTER COMPANY, A CORPORATION OF NEW JERSEY

TORQUE BEAM FOR RAILWAY TRUCKS

Application filed December 5, 1929. Serial No. 411,753.

This invention relates to a torque beam. More particularly it relates to a torque beam for use on a truck having two parallel, rotating axles, such as are used on the conventional railway truck.

The principal object of the invention is to provide a novel and relatively simple torque beam construction to be used between two rotating axles where power is to be transmitted to one of the axles.

Another object is to provide a rigid support for a gear box, mounted on a rotating axle to keep the uneven torque of a driving engine from building up destructive vibrations.

Another object is to resiliently connect the beam both to a housing enclosing the driven axle and to a bearing journaled to another axle.

These objects and others, which will be apparent, are obtained by the torque beam construction shown in the drawings and described in the detailed description to follow.

In the drawings,—

Figure 1 is a top plan view showing such parts of a car truck as are necessary to show the structure and function of the invention;

Figure 2 is a side elevation of the same elements shown in Figure 1;

Figure 3 is an enlarged detail of the bearing journal mounted on one of the axles of the truck; and, Figure 4 is an enlarged detail of the lower resilient connection for securing the torque beam to a gear housing.

In the drawings, the axles 1 are similar to the axles of the conventional railway car trucks, somewhat modified, with the driving arrangement shown. The wheels 2 are rigidly secured to the axles. The outer ends 3 of the axles, which project beyond the wheels, are formed with bearing surfaces to be fitted in journal boxes, not shown. A gear carrier in the form of a housing 4 carries suitable driving gears not shown for transmitting power to one of the axles 1. The gear carrier, as shown, is mounted on the axle and the housing which forms the carrier encloses a portion of the axle. The driving gears may be of any conventional construction and are not shown, as such elements do not form a part of this invention. A driving shaft 5 projects from the housing 4 and is mounted on suitable bearings provided within the housing. The torque beam 6 is substantially I-shaped in cross section and is dipped downwardly intermediate its ends to provide clearance below the frame structure of the truck mounted on the axles.

At one end, the torque beam 6 is provided with a vertical face 7 formed by webbed portions extending from the torque beam. A corresponding vertical face 8 is formed on the gear housing 4. As shown in detail in Figure 4, the two faces 7 and 8 are resiliently secured together at the top and bottom by bolts 9 and springs 10.

At the other end, the torque beam 6 is provided with a horizontal extension 11 which is adapted to seat above the upper half of a journal box 12 fitted around the axle 1. The lower half of the journal box is similar to the upper half and is secured thereto by suitable securing means. The axle 1, on which the journal box is secured, is provided with a pair of spaced thrust collars 13 extending circumferentially around the axle. The portion of the axle between the thrust collars 13 provides a bearing surface for a sleeve 14 mounted in the journal box. A bolt 15 extends vertically through the upper half of the journal 12 and through the horizontal extension 11 of the torque beam. A compression spring 16 above the extension 11 gives the connection the desired flexibility.

Although the torque beam of this invention has been shown and described in connection with its use on a truck such as used on railway cars, it is to be understood that applicant claims as his invention any modification falling within the scope of the appended claims.

What is claimed is

1. A torque beam for a truck having two rotating axles one of which is driven, comprising a gear housing enclosing a portion of the driven axle, a bearing journal mounted on the other axle, and a torque beam resiliently secured to the housing and to the bearing journal.

2. A torque beam for a truck having two rotating axles one of which is driven, comprising a gear housing enclosing a portion of the driven axle, a drive shaft extending substantially horizontally from said housing and adapted to be driven by an external source of power to drive the enclosed axle, a vertical face on the opposite side of the housing, a torque beam extending substantially horizontally between the two axles, said torque beam having a vertical face at one end in engagement with the vertical face on the housing and resiliently secured thereto, the other end of said torque beam having a horizontal portion extending to the second axle and secured to a bearing sleeve mounted on said axle.

3. A torque beam for a truck having two rotating axles one of which is driven, comprising a gear housing enclosing a portion of the driven axle, a drive shaft extending from said housing and adapted to drive the enclosed axle, a vertical face on the opposite side of the housing, a torque beam extending substantially horizontally between the two axles, said torque beam having a vertical face at one end in engagement with the vertical face on the housing, means for resiliently securing the two faces together at the top and bottom consisting of compression springs and bolts passing therethrough and through the two faces, a bearing sleeve mounted on the second axle, a horizontal extension on the end of said torque beam opposite the housing, and means for securing said extension to the bearing sleeve.

4. A torque beam for a truck having two rotating axles one of which is driven, comprising a gear housing enclosing a portion of the driven axle, a drive shaft extending substantially horizontally from said housing adapted to drive the enclosed axle from an external source of power, a torque beam extending substantially horizontally between the two axles, said torque beam having one end in engagement with the housing and resiliently secured thereto, the other end of said torque beam having a horizontal portion extending over the second axle, a bearing sleeve mounted on said axle, and means for securing the flattened end of the torque beam to the bearing sleeve.

5. A torque beam for a truck having two rotating axles one of which is driven, comprising a gear housing enclosing a portion of the driven axle, a drive shaft extending from said housing adapted to drive the enclosed axle, a vertical face on the opposite side of the housing, a torque beam extending substantially horizontally between the two axles, said torque beam having a vertical face at one end in engagement with the vertical face on the housing and secured thereto, the other end of said torque beam having a horizontal portion extending over the second axle, a bearing sleeve mounted on said axle, means on the axle to prevent axial movement of said sleeve, and means for resiliently securing the flattened end of the torque beam to the bearing sleeve.

6. A torque beam for a truck having two rotating axles, one of which is driven, comprising a gear carrier mounted on the driven axle and a torque beam secured to the other axle and resiliently secured to the carrier.

In testimony whereof I affix my signature.

GUSTAF W. ENGSTROM.